(No Model.)
G. W. CODY.
CUTTING BOARD.
No. 297,351. Patented Apr. 22, 1884.
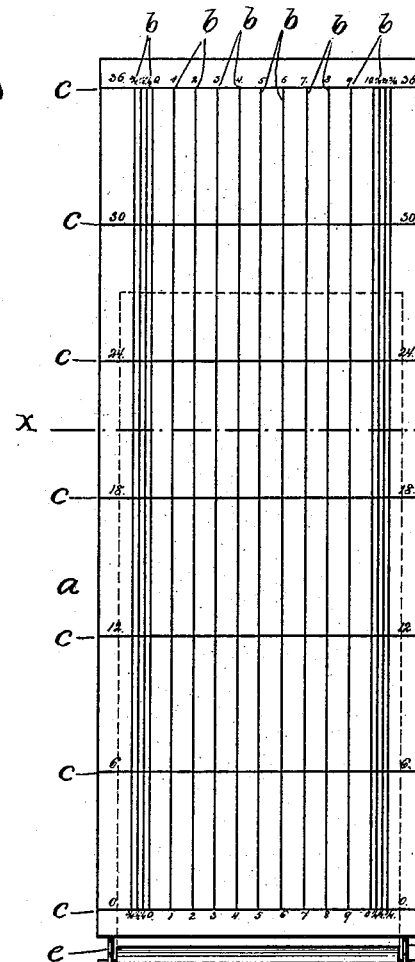
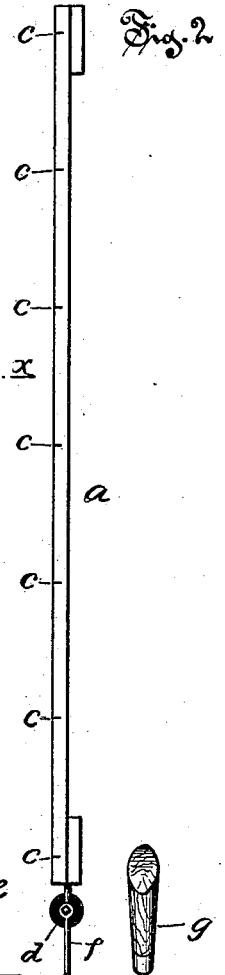
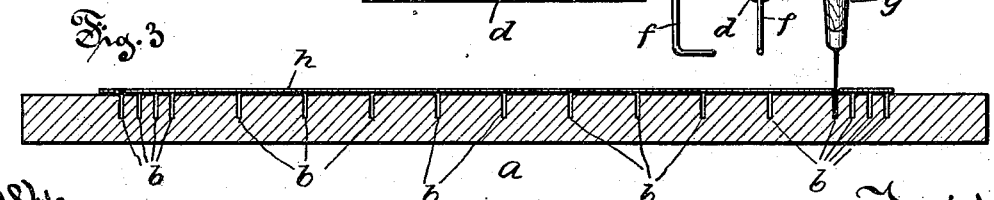
Witnesses
W. M. Bjoerkmann
E. F. Dimock
Inventor
George W. Cody
By Simonds & Burdett
Attys.

UNITED STATES PATENT OFFICE.

GEORGE W. CODY, OF HARTFORD, CONNECTICUT.

CUTTING-BOARD.

SPECIFICATION forming part of Letters Patent No. 297,351, dated April 22, 1884.

Application filed August 14, 1883. (No model.)

*To all whom it may concern:*

Be it known that I, GEORGE W. CODY, of Hartford, in the county of Hartford and State of Connecticut, have invented certain new and useful Improvements in Cutting-Boards; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1 is a plan view of my improved cutting-board with the roller attached to one end. Fig. 2 is an edge view of the same. Fig. 3 is a view in cross-section of the same, on enlarged scale, on plane denoted by lines *x x* of Fig. 1.

My invention relates to the class of devices used as a rest or form upon which to cut sheets of various materials into certain desired shapes.

My invention consists in a board or table having in its surface a series of parallel grooves arranged at any desired intervals, these grooves being cut at right angles by another series of grooves arranged at intervals, when combined with a suitable bearing or rest for supporting a roll of material—as window-shade stuff—while pieces of any required size are being cut from the roll.

In the accompanying drawings, the letter *a* denotes my improved board as a whole, which, in the form shown, is preferably about three times as long as it is wide, and is especially adapted for cutting and trimming window-shades and the like. In the surface of this board longitudinal parallel grooves *b* are cut, preferably at intervals of one inch, except at the edges, where the intervals are reduced to a quarter of an inch. Widthwise the surface of the board is intersected by a series of transverse grooves, *c*, arranged, in the form shown in the drawings, at intervals of six inches. To one end of the board the roller *d* is attached in suitable bearings, *e*, and is provided with a crank, *f*, by means of which material to be cut may be wound upon the roller. The grooves in the surface of the board or table are made of sufficient width and depth to guide the cutting-knife, the end of the blade of which is inserted in the proper groove, which guides the knife as it is drawn along the groove. A knife, *g*, is shown in Fig. 3 as inserted in one of these grooves as in operation for cutting the material *h*, laid upon the surface of the board.

The material to be cut is drawn from the roller, spread upon the surface of the table, and while held at the outer end a knife is inserted in one of the grooves and drawn along in it, cutting off the material to any desired width or length. The position of the material as spread upon a board is indicated by the dotted lines in Fig. 1.

The old method of cutting window-shades and the like is to spread the material upon a cutting board or table having a plane surface, and to trim the shade to the desired length by means of straight-edges and squares. In this method it is customary to pin the straight-edge down upon the material by means of awls thrust through the straight-edge and material into the board. The latter soon becomes seamed and cut in many directions, and the knife-blade is apt to be turned from its desired line of cutting into one or more of the old cuts crossing obliquely the line of the new cut. In this method the board soon becomes useless, and the work done, at the best, is liable to be unsatisfactory. By means of my improvement the edges cut are always straight and at right angles with or parallel to each other, and it obviates the necessity of using either straight-edge or square.

I claim as my invention—

A cutting-board, *a*, having the longitudinal grooves *b* and the transverse grooves *c*, arranged substantially as shown and described, in combination with a roller, *d*, supported in suitable brackets or bearings, all substantially as described.

GEORGE W. CODY.

Witnesses:
CHAS. L. BURDETT,
W. M. KYORKMAN.